US012797826B2

(12) United States Patent
Guerriero et al.

(10) Patent No.: US 12,797,826 B2
(45) Date of Patent: Nov. 17, 2026

(54) CARTIDGES COMPRISING ADSORBENT FILTERS PRE-LABELLED WITH STANDARDS FOR THE EVALUATION OF SAMPLING OF POLLUTANTS IN LIQUID AND AERIFORM MATRICES

(71) Applicant: Chemical Research 2000 Srl, Rome (IT)

(72) Inventors: Ettore Guerriero, Rome (IT); Paolo Benedetti, Rome (IT); Andrea Manni, Rome (IT); Marina Cerasa, Rome (IT)

(73) Assignee: Chemical Research 2000 Srl, Rome (IT)

( * ) Notice: Subject to any disclaimer, the term of this patent is extended or adjusted under 35 U.S.C. 154(b) by 769 days.

(21) Appl. No.: 18/018,003

(22) PCT Filed: Jul. 29, 2021

(86) PCT No.: PCT/IB2021/056894

§ 371 (c)(1),
(2) Date: Jan. 25, 2023

(87) PCT Pub. No.: WO2022/034422

PCT Pub. Date: Feb. 17, 2022

(65) Prior Publication Data

US 2023/0271159 A1 Aug. 31, 2023

(30) Foreign Application Priority Data

Aug. 11, 2020 (IT) ........................ 102020000019936

(51) Int. Cl.
*B01J 20/28* (2006.01)
*B01J 20/20* (2006.01)
*B01J 20/282* (2006.01)
*B01J 20/286* (2006.01)

(52) U.S. Cl.
CPC ......... *B01J 20/28038* (2013.01); *B01J 20/20* (2013.01); *B01J 20/28023* (2013.01); *B01J 20/28061* (2013.01); *B01J 20/28069* (2013.01); *B01J 20/282* (2013.01); *B01J 20/286* (2013.01)

(58) Field of Classification Search
CPC .................. B01J 20/28038; B01J 20/20; B01J 20/28023; B01J 20/28061; B01J 20/28069; B01J 20/282; B01J 20/286
See application file for complete search history.

(56) References Cited

U.S. PATENT DOCUMENTS

| | | | | |
|---|---|---|---|---|
| 4,118,316 | A | 10/1978 | Talley et al. | |
| 4,539,399 | A | 9/1985 | Armstrong | |
| 7,291,263 | B2 * | 11/2007 | Ward | B01J 20/28028 210/656 |
| 8,795,588 | B2 * | 8/2014 | Dardas | B01D 53/0423 422/4 |
| 9,149,764 | B2 * | 10/2015 | Sugimoto | B01D 53/66 |
| 9,409,162 | B2 * | 8/2016 | Bohringer | B01J 20/3204 |
| 11,229,932 | B2 * | 1/2022 | Maness | B09B 3/80 |
| 11,344,933 | B2 * | 5/2022 | Short | B32B 5/022 |
| 2004/0016341 | A1 * | 1/2004 | Tipler | B01D 53/025 95/82 |

FOREIGN PATENT DOCUMENTS

WO 2017021883 A1 2/2017

OTHER PUBLICATIONS

Feng Juanjuan et al., "Development of a cheap and accessible carbon fibers-in-poly(ether ether ketone) tube with high stability for online in-tube solid-phase microextraction", TALANTA, vol. 148, Nov. 9, 2015 (Nov. 9, 2015), p. 313-320.
Cerasa Marina et al., "Validation studies on activated carbon fiber passive sampler for PCDD/Fs and PCBs in water", Chemosphere 239 (2020) 124666.
Murata, "Kynol Fibers", Internet Jul. 10, 2017 (Jul. 10, 2017), p. 1-4.
Amvrazi et al., "Multiresidue Method for Determination of 35 Pesticides in Virgin Olive Oil by Using Liquid-Liquid Extraction Techniques Coupled with Solid-Phase Extraction Clean Up and Gas Chromatography with Nitrogen Phosphorus Detection and Electron Capture Detection" J. Agric. Food Chem. 2006, 54, 9642-9651.
Sanchez et al., "Determination of Nitroaromatic Compounds in Air Samples at Femtogram Level Using C18 Membrane Sampling and On-Line Extraction with LC-MS" Anal. Chem. 2003, 75, 4639-4645.
Mutzner et al., "Passive samplers to quantify micropollutants in sewer overflows: accumulation behaviour and field validation for short pollution events" Water Research (2019).
Leandro et al., "Semiautomated Determination of Pesticides in Water Using Solid Phase Extraction Disks and Gas Chromatography-Mass Spectrometry" J. Agric. Food Chem. 2006, 54, 645-649.
Tollback et al., "Air sampling with Empore solid phase extraction membranes and online single-channel desorption/liquid chromatography/mass spectrometry analysis: Determination of volatile and semi-volatile organophosphate esters" Journal of Chromatography A, 1129 (2006) 1-8.
Beltrame et al., "Adsorption of caffeine on mesoporous activated carbon fibers prepared from pineapple plant leaves" Ecotoxicology and Environmental Safety 147 (2018) 64-71.
Van Loon et al., "Quantitative Determination of Total Molar Concentrations of Bioaccumulatable Organic Micropollutants in Water Using C18 Empore Disk and Molar Detection Techniques" Anal. Chem. 1996, 68, 2916-2926.
Certified Italian application No. 102015000041588.

(Continued)

*Primary Examiner* — Stuart L Hendrickson
(74) *Attorney, Agent, or Firm* — Gregory P. Einhorn; Greer, Burns & Crain, Ltd.

(57) ABSTRACT

A filtering and adsorbent sampling and enrichment system comprising a stationary phase consisting of a felt of activated carbon fibres with a micro-meso porous conformation and specific surface area of about 1500 m2/g and sampling and/or enrichment standards, confined within a closed casing, is described, as well as the method for obtaining it and the relative process for the analysis of organic and inorganic analytes that uses said system.

22 Claims, 7 Drawing Sheets

(56) References Cited

OTHER PUBLICATIONS

Method 23—Determination of Polychlorinated Dibenzo-P-Dioxins and Polychlorinated Dibenzofurans From Stationary Sources.
Winberry, Jr. et al. "Compendium Method TO-4A" Compendium of Methods for the Determination of Toxic Organic Compounds in Ambient Air, Second Edition, EPA 600/4-89-018.
Pinasseau et al., "Calibration and field application of an innovative passive sampler for monitoring groundwater quality" https://www.sciencedirect.com/science/article/pii/S0039914019309403.
Winberry, Jr. et al. "Compendium Method TO-9A" Compendium of Methods for the Determination of Toxic Organic Compounds in Ambient Air, Second Edition, EPA 600/4-89-018.

* cited by examiner

CARTIDGES COMPRISING ADSORBENT FILTERS PRE-LABELLED WITH STANDARDS FOR THE EVALUATION OF SAMPLING OF POLLUTANTS IN LIQUID AND AERIFORM MATRICES

This application is a U.S. national phase application claiming benefit of priority under 35 U.S.C. § 371 to Patent Convention Treaty (PCT) International Application serial number PCT/IB2021/056894, filed Jul. 29, 2021, now pending, which claims the benefit of priority to Italian patent No. 102020000019936 filed on Aug. 11, 2020. The aforementioned applications are expressly incorporated herein by reference in their entirety and for all purposes.

BACKGROUND OF THE INVENTION

The present invention refers to the field of environmental sampling of the pollutants and more precisely of analytes dispersed in fluid matrices, in particular it concerns filtering and adsorbing systems which are previously spiked with reference standards and the use thereof for the simultaneous sampling of organic and inorganic compounds in liquid and aeriform matrices.

BACKGROUND

Air sampling of semi-volatile organic compounds is performed by placing sampling standards on the filter or on the absorbent/adsorbent material capable of retaining the vapour fraction of analyte that is not retained by the filter. Said sampling system may, for example, consist of an air sampler equipped with a 102-millimetre diameter quartz fibre filter, followed by an absorbent made of 50 mm thick polyurethane foam (PUF) with a density of 0.022 g/cm$^3$. Sampling time can range from a few hours up to reaching weekly samplings with a flow equal to 225 l/minute for a total of about 2200 m$^3$ of air depending on whether the sampling is carried out indoors or outdoors.

Table 1 below compares the outdoor and indoor sampling methods of the U.S. Environmental Protection Agency (EPA) and of the International Standard Organization (ISO) for Dibenzofurans and polychlorinated (PCDD/Fs), polybrominated (PBDD/Fs) Dibenzo-p-Dioxins, and brominated or chlorinated pesticides and polychlorinated biphenyls (PCBs). All the methods in Table 1 use the same capture and sampling system.

TABLE 1

| | ISO 16000-13 and 14 | EPA-TO 4A | EPA-TO 9A |
|---|---|---|---|
| Analytes of interest | PCDD/Fs and PCBs indoor | PCBs and pesticides Ambient air | PCDD/Fs, PBDD/Fs Ambient air |
| Sampling System | High Volume Samplers | High Volume Samplers | High Volume Samplers |
| Capture system | Quartz Fibre Filter + PUF | Quartz Fibre Filter + PUF | Quartz Fibre Filter + PUF |
| Sampling Standards | 100 μL for 0.01 ng WHO-TEQ PCB/m3 (3600 pg of each congener). 100 μL for 100 fg TEQ/m3 PCDD/Fs (25 pg for Penta and Hexa; 50 pg of Hepta) for 180 m$^3$ of sampled air | NO | 800 pg of $^{37}$Cl - 2,3,7,8-TCDD or a mix of 4 $^{13}$C-labelled standards |
| Extraction Standards | 100 μl for 0.01 ng WHO-TEQ PCB/m3 (3600 pg of each congener). 100 μL for 100 fg TEQ/m3 PCDD/Fs (25 pg for tetra, penta and Hexa; 50 pg for Hepta and Octa) | 100 ng of $^{13}$C-labelled Standard | 1000 pg of $^{13}$C-labelled Standard |
| Extraction in Soxhlet | The sampling media (filter and PUF) are extracted together in Toluene for 36 h. | The sampling media (filter and PUF) are extracted together in 10% diethyl ether and Hexane for a minimum of 16 h. | The sampling media (filter and PUF) are extracted together with 275 mL of benzene for 16 h. |

The use of the Sampling Standard is defined as fundamental by ISO 16000 13A and 14A, EPA TO9A regulations. In fact, a sample is valid for quantification only if the percentage recoveries of that standard fall within predetermined ranges. Although EPA TO 4A does not require labelling, the validity of the sampling can only be guaranteed for these analytes (the same as assessed in ISO 16000 13 and 14) with this step.

The capture medium on which the Sampling Standard is added may be different: polyurethane foam (PUF) in ISO 16000 Method 13, or on a filter in EPA TO-9A (EPA TO-9A, "Method TO-9A: Determination Of Polychlorinated, Polybrominated And Brominated/Chlorinated Dibenzo-p-Dioxins And Dibenzofurans In Ambient Air,") EPA Methods, no. January, pages 1-94, 1999; EPA TO-4A, "Method TO-4A: Compendium of Methods for the Determination of Toxic Organic Compounds in Ambient Air Second Edition Compendium Method TO-4A Determination of Pesticides and Polychlorinated Biphenyls in Ambient Air Using High Volume Polyurethane Foam (PUF)," EPA Methods, no. January, pages 1-53, 1999; ISO/DIS 16000-13, "ISO/DIS 16000-13—Indoor air—Part 13: Determination of total (gas and particle-phase) polychlorinated dioxin-like biphenyls and polychlorinated dibenzo-p-dioxins/dibenzofurans—Collection on sorbent-backed filters," 2007; I. 16000-14, "ISO/DIS 16000-14—Indoor air—Part 14: Determination of total (gas and particle-phase) polychlorinated dioxin-like biphenyls (PCBs) and polychlorinated dibenzodioxins/dibenzofurans (PCDDs/PCDFs)—Extraction, clean-up and analysis by high resolution ga," 2007.

All of the above mentioned methods require that the filter and the PUF are also labelled with an extraction standard used to calculate the recovery of the sampling standards. The filtering and adsorbing capture media are extracted together, through a Soxhlet extractor, with solvents and for variable times depending on the method. The extract is then purified and the analytes separated by class, usually using preparative chromatographic techniques. The purified and separated fractions are concentrated up to a few μl and a third standard is added prior to instrumental analysis. This third standard, also referred to as a syringe standard, is an analyte or mixture whose amount is known and with a 100% recovery.

In the case of samplings, even long-term ones, of organic micropollutants from industrial emissions, the standards (e.g. EN 1948-1,4,5 EPA TO23) require a sampling system consisting of three separate compartments: a filtering system, an adsorbent/absorbent system and a condensation system. The filtering system may not be present, in which case the capture of the particulate matter is made directly on the adsorbent/absorbent system. In both cases, however, there is a Sampling standard and labelling can be carried out on site (at the measurement site) or previously in the laboratory. In the second case, there is an additional variable of uncertainty in the measurement, due to the possible loss of standards in the time interval that elapses between labelling in the laboratory up to sampling on site. These losses are even more pronounced if the standard is added on the filter rather than on the adsorbent/absorbent system. An additional error may be encountered when comparing the same analyte on the three capture systems following the addition of the Sampling standard on each of them. In fact, the loss of the standard owing to degradation or volatilisation does not occur in the same way in the three systems and the comparison is altered. For example, the method EN 1948 parts 1-2-3-4-5 dedicated to the sampling of polychlorinated dibenzo-p-dioxins (PCDD), polychlorinated dibenzo-p-furans (PCDF) and polychlorinated biphenyls (PCB) provides for the labelling of the different media according to the expected concentrations.

Adding Standards directly at the sampling site reduces errors in degradation and volatilisation of the Standard during transport. However, it remains difficult to automate the actual operation of adding the Standard: the variables that undoubtedly influence this parameter the most include the stability of the standard, the reproducibility of the operator and the subjective execution of the labelling between one operator and another, the atmospheric and environmental conditions in which the process is carried out. In the emission sampling, the environments are often dusty and contaminated with the analytes to be measured. Marking in such an environment increases the risk of overestimation of the pollutants in emission due to contamination of the sampling filter during the environmental exposure in the labelling process.

Marking on site also greatly increases the time needed to prepare a measurement campaign. This is even more evident when it comes to sequential sampling systems whose on-site labelling makes the operation slow, laborious, error-prone and exposes the operator and the surrounding environment to contamination risks.

With regards to liquid matrices, the sampling or the enrichment can be performed using filters or adsorbents. A support is known in the art which consists of a filter on which microparticles of silica derivatised with octadecyl or octyl groups (ENVI-Disk™, Sigma Aldrich), commonly used for solid-phase extraction of organic compounds from aqueous samples, i.e. analytes dispersed in aqueous matrices, are dispersed (E. G. Amvrazi and T. A. Albanis, "Multiresidue method for determination of 35 pesticides in virgin olive oil by using liquid-liquid extraction techniques coupled with solid-phase extraction clean up and gas chromatography with nitrogen phosphorus detection and electron capture detection," J. Agric. Food Chem., vol. 54, no. 26, pages 9642-9651, 2006, doi: 10.1021/jf061375s).

Alternatively, the solid phase extraction of organic compounds from aqueous matrices can be performed with Empore™ systems manufactured by 3M, consisting of adsorbent particles (such as spheres of divinylbenzene or of silica derivatised with octadecyl or octyl groups or from carbon) embedded within a polytetrafluoroethylene lattice. Empore™ disks are commonly used for solid-phase extraction of the organic compounds from liquid matrices (W. M. G. M. Van Loon, F. G. Wijnker, M. E. Verwoerd, and J. L. M. Hermens, "Quantitative Determination of Total Molar Concentrations of Bioaccumulatable Organic Micropollutants in Water Using C18 Empore Disk and Molar Detection Techniques," Anal. Chem., vol. 68, no. 17, pages 2916-2926, 1996, doi: 10.1021/ac951136w), as passive samplers or enrichment systems as in the case of groundwater or wastewater monitoring (L. Pinasseau et al., "Calibration and field application of an innovative passive sampler for monitoring groundwater quality," Talanta, vol. 208, no. June 2019, p. 120307, 2019, doi: 10.1016/j.talanta.2019.120307; L. Mutzner et al., "Passive samplers to quantify micropollutants in sewer overflows: accumulation behaviour and field validation for short pollution events," Water Res., vol. 160, pp. 350-360, 2019, doi: 10.1016/j.watres.2019.04.012), and as passive samplers of airborne organic micropollutants (C. Sánchez, H. Carlsson, A. Colmsjö, C. Crescenzi, and R. Batlle, "Determination of nitroaromatic compounds in air samples at femtogram level using C18 membrane sampling and on-line extraction with LC-MS," Anal. Chem., vol. 75, no. 17, pages 4639-4645, 2003, doi: 10.1021/ac034278w; J. Tollbâck, D. Tamburro, C. Crescenzi, and H. Carlsson, "Air sampling with Empore solid phase extraction membranes and online single-channel desorption/liquid chromatography/mass spectrometry analysis: Determination of volatile and semi-volatile organophosphate esters," J. Chromatogr. A, vol. 1129, no. 1, pages 1-8, 2006, doi: 10.1016/j.chroma.2006.05.086).

"Sandwich" filters like the Atlantic SPE Disk™ (Horizon Technologiy) are also known in which the adsorbent material is positioned between two layers of quartz or paper. The adsorbent material can be silica microspheres derivatised with e.g. octadecyl, styrene/divinylbenzene or combination of N-vinylpyrrolidone and divinylbenzene and which are used in the solid-phase extraction of organic compounds from aqueous matrices (C. C. Leandro, D. A. Bishop, R. J. Fussell, F. D. Smith, and B. J. Keely, "Semiautomated determination of pesticides in water using solid phase extraction disks and gas chromatography-mass spectrometry," J. Agric. Food Chem., vol. 54, no. 3, pages 645-649, 2006, doi: 10.1021/jf051874d).

U.S. Pat. No. 3,002,823 discloses a silica gel chromatography method for separating compounds of different molecular weights in the aqueous phase. It is a filler-free granular gel consisting of a three-dimensional set of molecules bonded with aliphatic radicals (from 3 to 10 carbon atoms) whose content of —OH groups is equal to at least 12% of the dry weight of the gel. The latter is obtained by polymerisation of organic substances (filler-free with —OH groups) with organic substances containing halides or epoxy groups.

U.S. Pat. No. 4,118,316 discloses a gel chromatography method for separating compounds of different molecular weights using porous silanised silica supports functionalised with quaternary ammonium groups.

U.S. Pat. No. 4,539,399 discloses a silica gel functionalised with cyclodextrins by binding to silanols which can be used in thin-layer chromatography.

All the supports known in the art and described so far can be pre-labelled with sampling standards which can be analytes similar to those of interest or the same as the analytes to be sampled but with labelled atoms, i.e. isotopically different from those that are found in the samples.

European Patent Application No. 13801779.3 discloses filters made of quartz fibre or glass fibre or sintered silica, silanised with the (Si—O)n-Si—Rm group where —(Si—O)— is the functionalised surface fraction and R is a functional group adapted to retain the analytes present in the liquid and aeriform matrices, while n and m are integers where n+m=4, n>0, m>0, having a retention percentage of dust with a diameter greater than 0.3 μm greater than 80%, a thickness of 0.01-50 mm and an area from 0.1 to 2500 $cm^2$.

Italian patent no. 102015000041855, corresponding to international patent application no. PCT/IB2016/054644, discloses a stationary phase for analytical use for organic and inorganic compounds, gases and vapours. In particular, these include volatile organic compounds (VOCs), semi-volatile organic compounds (VOCs) and mercury vapours. The stationary phase consists of carbon fibres, activated and non-activated, possibly functionalised or coated, in the form of a bundle of carbon fibres that can be entangled, intertwined, woven, in strands, spun in parallel, interwoven, woven in the form of a tube, woven in the form of a disc, entangled in the form of a tube, entangled in the form of a disc. It further describes a process for the analysis of analytes comprising trapping the analytes on the stationary phase, the recovery of analytes by desorption and the quantification of analytes.

In Italian Patent No. 102015000041855, corresponding to the International Patent Application No. PCT/IB2016/054644 three issues are not taken into consideration. The first problem is that of material defibration, which can lead to a loss of the adsorbent material and makes it difficult to use activated carbon fibres (ACF) to create stable, effective and reproducible adsorbent substrates. In addition, the fibres released, due to their size and the possible presence of toxic compounds on them, may cause harm to the operator if inhaled or ingested after sampling. The second problem is the characterisation of the activated carbon fibres (ACF) used, as not all activated carbon fibres (ACF) ensure good analytical performance and some of them are more difficult to handle and treat than others. The last problem is that of distribution of the standard in a homogeneous, automatic, reproducible and precise way, which topic is of great importance in order to obtain reliable data on the success of the sampling itself, especially if the aforementioned distribution has to take place on large surfaces.

The scientific publication Cerasa et al. 2020, Validation studies on activated carbon fibre passive sampler for PCDD/Fs and PCBs in water, Chemosphere, January; 239:124666. doi: 10.1016/j.chemosphere.2019.124666. Epub 2019 Aug. 25 describes the use of pre-labelled carbon fibre adsorbent membranes in aqueous matrices, demonstrating the possibility of using the activated carbon fibre (ACF) adsorbents also in this matrix as well as in air. Said materials have not been spiked with isotopically labelled standards and/or sampling standards. The characteristics of the activated carbon fibres (ACF) are shown in the table.

TABLE 2

| | ACF Cerasa et al |
|---|---|
| SSA (specific superficial area) | >2000 $m^2/g$ |
| Pore diameter | 1.2 nm |
| | Micorporous solids |
| Chemical characterisation (in $10^{-6}$ meq/$m^2$) by Boehm titration | |
| Carboxyl groups | 76 |
| Lactone groups | 3 |
| Phenolic groups | 57 |
| Pyronic groups | 111 |
| Acidic groups | 126 |

In particular, Cerasa et al. 2020 reports data for the validation of activated carbon fibre (ACF) membranes for the quantitative adsorption and desorption of PCDD/Fs and PCBs in water as a replacement for the standard liquid/liquid extraction technique. The validation is carried out according to the requirements of the Standard Methods EPA 1613 and EPA 1668, which envisage the Liquid/Liquid Extraction technique; the results of the adsorption and the desorption of the pollutant classes from the activated carbon fibres (ACF) are then compared to those of the L/L of a standard added in water. In Cerasa et al. 2020, the methods do not include the addition of standards of isotopically labelled congeners on the adsorbent membrane prior to the extraction or enrichment. An isotopically labelled standard in water was used to obtain quantitative results, thus simulating a sampling with labelled congeners; in fact, using a standard of native congeners would have entailed the possibility of having altered results from interferents already present in the water.

Technical Problem

The function of the sampling standards is to assess the possible losses of analyte during the same sampling. Said losses may be due to the breakthrough of the filtering/adsorbent system, to reactions with substances present in the sampled matrix, to possible evaporation or degradation processes occurring during the time that elapses between sampling and the subsequent chemical analysis. The sampling of the analyte can be both passive and active: in the first case the analyte reaches the enrichment system by diffusion and in the second case by using pumps. For very diluted analytes, it is necessary to sample large volumes of matrix in order to be able to exceed the limit of quantification (LOQ): in these cases, resorting to active samplings on an enrichment system, also known as capture system, is in fact mandatory for sampling in a reasonably short times, i.e. comprised between 24 and 300 hours. An ideal capture system totally retains the analyte, letting the rest of the matrix pass through; a real capture system retains a good percentage of the analyte, together with other compounds present in the matrix (interferents). High sampling volumes can lead to a breakthrough of the capture system, while high interferent values can degrade the analytes of interest. The addition of the sampling standard serves to assess such aberrations. The efficiency of an enrichment system is defined as the ratio of the amount of analyte collected to the total amount of analyte passing through it. The capacity of an enrichment system is defined as the maximum amount of analyte it can retain before becoming saturated and losing/altering its efficiency.

The obtained sample thus consists of the enrichment system with analyte, interferents and sampling standards that define the goodness of the same sampling. Each sampling is associated with the value of the sampled volume. The analyte is extracted from the sample with a mixture of solvents selected so as to extract the maximum amount of analyte and the minimum amount of interferents. The sampling standards will be extracted in a similar manner because they will be selected so as to have chemical/physical behaviours similar to the analytes and in the case of isotopically labelled compounds they will have equivalent chemical/physical behaviour. It may be necessary to further purify the extract before proceeding with the analysis. An alternative to the solvent extraction is the thermal desorption where the analyte interacts weakly with the analyte, is volatile at operating temperatures, the desorption enthalpy is less than the energy needed to degrade the analyte, and the interferents are less volatile or absent.

Thus, the analyte sampling process envisages the introduction of sampling standards, at known concentrations, possibly isotopically labelled, which are either compounds similar to the analytes to be sampled or are the isotopically labelled analytes themselves, onto the capture systems prior to sampling, at the step known as sampling labelling.

The labelling step is carried out before the sampling system is transported to the measurement site or is performed extemporaneously at the time of sampling.

Unfortunately, in the sampling devices known in the art, there is a loss of the sampling standards which can alter the veracity of the sampling itself. Losses can occur due to evaporation processes that take place in the time that elapses between the preparation of the standard, the sampling and the subsequent chemical analysis. Losses of the sampling standard can also occur when the system is handled in unsuitable places with potential danger to the operator.

The choice of the adsorbent is also crucial for a proper sampling of the analytes present in the matrix. An inadequate adsorbent does not guarantee that a homogeneous and representative sample is obtained, which feature is essential to be able to provide an accurate analytical datum. The material chosen must therefore be capable of quantitatively adsorbing the analytes present in the sample without undergoing environmental interferences or significant sample losses, wherein the reference percentages are established by the methods used.

The same inventors themselves have verified that the devices described in patent 102015000041855 can be implemented in order to be able to pre-spike them with the reference standards, without incurring the drawbacks found in the devices known in the art, by using a material that is not susceptible to defibration through the confinement/encapsulation thereof.

The proposed technical solution allows overcoming the problems of the devices known in the art, facilitating sampling operations in measurement campaigns, avoiding handling chemicals in unsuitable places (both for the safety of operators and to ensure the goodness of the standards handled outside controlled environments such as chemical laboratories may be), reducing both the losses of reference analytes and of analytical artefacts.

The present inventors have therefore devised filtering/adsorbent systems that are capable of retaining semi-volatile organic and inorganic standard compounds that ensure the sampling/enrichment assessment of the analytes from fluid matrices in the presence or absence of particulate matter. Said pre-spiked systems of sampling standards have a high capacity to quantitatively retain standards unaltered over the time that elapses between the moment they are added to the system until they are used. In this way, it is possible to achieve greater recoveries from the sampling standards, thereby decreasing the measurement uncertainty and increasing the precision and accuracy of the method.

Another technical problem solved by the present invention is that of stripping/defibration.

In fact, the systems known in the art of applying activated carbon fibres (ACF) for analytical purposes suffer from a loss of fibre cohesion from the material itself during handling, resulting in defibration with consequent non-quantifiable loss of adsorbent material. This physical characteristic ensures that the use of activated carbon fibre filters (ACF) as such as sampling systems is strongly conditioned, as their structural integrity cannot be guaranteed. In fact, the release of fibres of variable dimension into the cleaning solvent can be observed already during the washing step, preliminary to sampling, of the membrane, which is normally carried out in the same way as the extraction is performed. The defibration is also macroscopically visible when handling the filter itself, which releases material on the supports in which it is placed or on the gloves used by the operator. The fibres that are released have the same adsorptive properties as the source material. This event causes a non-reproducible and non-quantifiable loss of the Sampling Standard added on the membrane at time t=0, which can cause repercussions on safety in the workplace and non-reproducible and non-quantifiable loss of the sample. The defibration of the activated carbon fibres (ACF) is not quantifiable as it is dependent on the subjective handling and therefore the Percentage Recovery of the Sampling Standard will be highly variable. The released fibres from the activated carbon fibres (ACF) may affect portions of the material on which the sampling standard has been added. The percentage recoveries of this standard are fundamental in order to validate a quantitative analysis and will therefore be affected by a completely uncontrollable variable that can lead to a correctly performed sampling being rendered useless. Handling may involve the simple packaging of the pre-labelled membrane or the transport and use thereof. The defibration of a filter sampled or one on which the standard has been simply added can also cause problems of occupational hygiene. These fibres enriched with potentially toxic analytes can be easily air-dispersed and therefore breathed in or involuntarily ingested by the operators during all the filter handling processes.

The fibre loss (also known as stripping) can occur not only during the filter handling steps, but also during the sampling or extraction steps. In the first case, the loss of fibres, in addition to leading to a possible underestimation of the sampling standard, can lead to a loss of the sample that is not quantifiable as well as an absolute loss of capacity of the adsorbent medium. In the second case, the extraction efficiency may be very low and totally uncontrollable. Each of the fibres from the filter has in fact exactly the same adsorptive capacity as the original membrane and if present even in traces inside an extract they will tend to passively adsorb the native compounds and the standard. This occurs with any type of liquid extraction and can lead to an incorrect assessment of the sampling and extraction standards and of the target analytes themselves. The aforesaid problem arises whenever the activated carbon fibres (ACF) are to be used as such in the analytical field. It should be emphasized that this drawback cannot be simply solved by ultracentrifugation followed by the extraction of the deposited fibres, since the dimensions of the fibres themselves are such that they always remain in suspension, making the certain separation of the particulate non executable. Furthermore, even in the case of successful separation between the extract and the residual fibre impurities, the kinetics of partitioning of the analytes between the filtered fibres and the extraction solvent is not known and from time to time variable recoveries of analytes and sampling standard are obtained.

In the present invention, this technical problem is solved by encapsulation and/or confinement of the adsorbent membrane to avoid any loss of parts of the activated carbon fibres (ACF), by providing that the membranes are protected on all sides, unlike other types of confinement that provides for the adsorbent to be positioned between two filters (sandwich system) or to be dispersed in another device. The latter two types of system would not in fact guarantee that the released fibres are not dispersed during the handling of the filter. The proposed solution therefore envisages encapsulating/confining the membrane of activated carbon fibres (ACF) by including all the solutions that have the following characteristics: they do not interfere with sampling, by not significantly increasing the impedance thereof or reducing the adsorbing capacity of the material itself, they are compatible with the matrix to be sampled, they do not represent a competitor for the analytes and do not create sampling artefacts, they are compatible with the extraction or handling technique in the laboratory (therefore they are not thermolabile or degradable by pressure or due to the action of solvents). Further, it is designed to be adapted to the sampling instrumentation in the shape, thickness and orientation.

The encapsulation/confinement therefore avoids the leakage or loss of micro/macro-sized parts of the activated carbon fibre (ACF) membranes ensuring that there is no loss of the sampling standard and that the quantitative analyses on real samples are accurate. It further ensures easier handling of the activated carbon fibre (ACF) membranes. The closure process ensures an excellent tightness and resistance to chemical and physical stress and does not interfere with the sampling system.

Another advantage is the fact that it can also act on a micro-scale without adversely affecting the material inside the casing. The confinement system is realised without altering the stability of the standard previously added thereon and ensures that the standard can also be added after sealing without competing with the activated carbon fibres (ACF).

Depending on the application and the extraction system, the confinement material can be previously washed with solvents.

Another element that has been considered in the following invention is the choice of type of ACF whose chemical-physical characteristics vary based on the degree of activation and thus on the industrial processes they underwent. By increasing the degree of activation, the technological processes for non-analytical purposes have more stringent parameters that increase the specific surface area, the adsorbing capacity and increase the purity of the adsorbent, but also make it more fragile. The result is a material with less cohesion promoting the defibration thereof.

OBJECT OF THE INVENTION

The aforesaid technical problem is solved by providing a filtering and adsorbent sampling and enrichment system comprising

- a stationary phase consisting of felt fabric of activated carbon fibres with a micro-meso porous conformation and specific surface area of about 1500 $m^2/g$
- and sampling and/or enrichment standards, confined within a closed casing.

A further object of the present invention is the process for the preparation of a filtering and adsorbent sampling and enrichment system comprising a stationary phase consisting of felt type fabric of activated carbon fibres with a micro-meso porous conformation and specific surface area of about 1500 $m^2/g$ and sampling and/or enrichment standards, confined within a closed casing.

A further object of the present invention is the process for the analysis of organic and inorganic analytes by using a filtering and adsorbent sampling and enrichment system comprising a stationary phase consisting of felt type fabric of activated carbon fibres with a micro-meso porous conformation and specific surface area of about 1500 $m^2/g$ and sampling and/or enrichment standards, confined within a closed casing.

Further features of the present invention will be clear from the following detailed description with reference to the experimental examples and the attached drawing tables.

DETAILED DESCRIPTION OF THE INVENTION

Definitions

Figure 1:
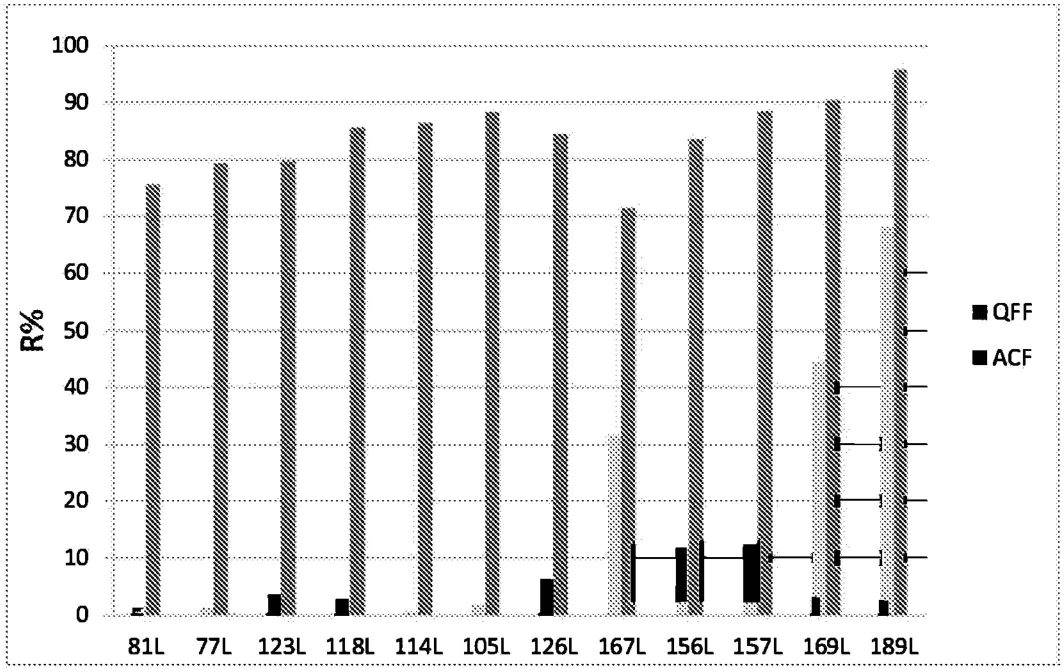
FIG. 1 shows in graph the comparison of the average percentage recovery of a MIX of $^{13}C$ PCB congeners added on QFF (Quartz Fibre Filters) and ACF (Activated Carbon Fibre) filters after exposure at a temperature of 35° C. for 24 h, Y axis R % (Percentage Recovery), X axis $^{13}C$-labelled PCB Congeners (L, Labelled).

Within the meaning of the present invention, carbon fibres (CF) refer to a material consisting of fibres about 5-10 microns in diameter and composed mainly of carbon atoms.

Within the meaning of the present invention, the activated carbon fibres (FCA) are fibrous carbonaceous adsorbents obtained by carbonization and activation of polymeric fibres, preferably of the phenol-aldehyde or poly (acrylonitrile) (PAN) type, such as those described for example in the Italian patent application no. 102015000041855, incorporated by reference.

Within the meaning of the present invention, the sampled organic and inorganic compounds are all classes of compounds of interest to analytical chemistry. Purely by way of example, they can be polycyclic aromatic hydrocarbons, polychlorinated biphenyls, polychlorinated dibenzo-para-dioxins and polychlorinated dibenzofurans, chlorobenzenes, alkylbenzenes, alkanes, phthalic acid esters, polybrominated diphenyl ethers, perfluoroalkylated drugs, active ingredients, Perfluoroalkylated Substances (PFAS-PFOA), metabolites, Mercury in elemental and bound form, semi-volatile metal halides.

Within the meaning of the present invention, sampling standard refers to any compound that is analogous or similar to the analytes to be sampled, or the isotopically labelled analytes themselves, which are added to the sampling system to reduce aberrations and measurement errors and to assess the veracity of the measurement.

An object of the present invention is a filtering and adsorbent sampling and enrichment system comprising a stationary phase consisting of felt type fabric of activated carbon fibres with a micro-meso porous conformation and specific surface area of about 1500 $m^2/g$ and sampling and/or enrichment standards, confined within a closed casing.

If necessary, the activated carbon fibres can be functionalised or coated.

Preferably the activated carbon fibres are coated with a coating selected from the group consisting of: Squalene, Methylsilicone OV-1, Methylsilicone SE-30, methyl-phenyl-silicone (20% phenyl) OV-7, methyl-phenyl-silicone (50% phenyl) OV-17, cyanopropyl-methyl-phenyl-silicone OV-225, Carbowax 20M (Polyethylene glycol), nitroterephthalic ester of PEG (FFAP), diethylene glycol succinate (DEGS).

Preferably the felt is woven or non-woven.

Preferably the felt is of the ACN 15 type.

The term ACN 15 denotes the Kynol type non-woven Felt with SSA determined by iodine adsorption 1500 $m^2/g$, mfibres 3.3 dtex, 80% non-crimped and 20% crimped for larger volumes.

The membranes of the present invention can be used in the sampling of analytes on site, through active or passive methods and also for the enrichment of samples from previously collected aeriform or liquid matrices.

In the latter, it is possible to also enrich the analytes present in the laboratory if a method requires it or if it is desired to lower the limits of quantification on an already collected sample or if it was not possible to use ACF at the sampling step.

A further object of the present invention consists in a process for the preparation of a filtering and adsorbent sampling and enrichment system comprising a stationary phase consisting of non-woven felt fabric of activated carbon fibres with a micro-meso porous conformation with a specific surface area of about 1500 $m^2/g$ and sampling and/or enrichment standards, confined within a closed casing comprising the following steps:

a) purification of the stationary phase from organic or inorganic impurities;
b) drying of the stationary phase obtained at the end of step a);
c) addition of the sampling standards,
d) encapsulation and closure of the casing without the use of glues and/or adhesives.

Preferably in step a) the purification is carried out by solvent extraction or by treatment with acids and oxidants and subsequent washes with water, most preferably MilliQ™ water.

Preferably in step b) the drying of the stationary phase is carried out under vacuum if in step a) the purification took place with a solvent or by thermal dehydration if in step a) the purification took place with acid and oxidant treatment.

In step c) the addition of the Sampling standard on the membranes is carried out in a uniform, reproducible and accurate manner.

Preferably in step c) the positioning of the sampling standards on the stationary phase takes place in n predefined positions. Preferably in step c) the positioning of the sampling standards on the stationary phase takes place by means of an automatic multi-tip dispenser which is able to dispense the sampling standard onto the membranes at different speeds in a fully repeatable and automatic manner.

In the automatic dispenser, the stationary phase is positioned on a rotating disk or oscillatory plate with adjustable and constant speed. The sampling standard is distributed simultaneously with the movement of the membrane, thus ensuring equal distribution over the entire surface.

The distribution of the sampling standard over the stationary phase can be concentric (n circles) in the case of a rotating plate or on n lines (continuous or interrupted, crossed or not) in the case of oscillating plates or in non-rotating movement.

Preferably the distribution of the sampling standard takes place with a quantitative precision equal to 10 μl±0.20 μl and 0.1% standard deviation.

Optionally in step c) stabilisers are added to the sampling standards.

The process avoids sampling standards being lost before measurement takes place, hence during the storage and/or the transport thereof.

For example, in the case of PCDD/Fs and PCBs, 4% tetradecane is added to the nonane solution in which the sampling standards are contained.

The sampling system is confined within a closed casing, wherein confinement is understood as a method for the closure on all sides thereof using a continuous material with a mesh size such that there is no release of the fibres to the outside.

Preferably the material of the casing is selected from the group consisting of: natural or synthetic polymers, cellulose or silica based sheets, wire meshes or combinations thereof.

More preferably, the material of the casing is selected from the group consisting of quartz fibre, polypropylene, nylon fibres, aldehydic fibres, phenolic fibres, amino fibres, vinyl fibre filters, cellulose fibres, cellulose derivatives and metal screens and combinations thereof.

The casing is closed by means of a technique selected from the group consisting of: sewing, thermal welding, chemical welding, electrical welding, pneumatic welding, ultrasonic welding, bonding, melting, bending, punching, riveting, closure with external closures or closure with cohesive solvents and the casing is never closed with a technique that involves the addition of any type of adhesive or glue.

The thus obtained filter is different from an encapsulated filter sandwiched between two filters.

The pre-labelled adsorbent filters with attenuated sampling standards can be stored at temperatures between 4 and 30° C.

In one embodiment of the present invention, the adsorbent filter is an ACF filter having a diameter of 102 millimetres, a thickness of 2 millimetres, and a surface area of about 1500 $m^2/g$.

Other embodiments can provide for example for a rectangular shape (filters for high volume) or other shapes according to the needs of use, or other diameters, for example 47 mm.

The process for the analysis of organic and inorganic analytes by using the filtering and adsorbent sampling and enrichment system comprising a stationary phase consisting of activated carbon fibres and sampling and/or enrichment standards provides for a step of capture of the analytes on the filtering and adsorbent sampling and enrichment system, followed by a step of analyte extraction and quantification.

The analytes can be extracted from the filter using common extraction techniques.

The filtering and adsorbent sampling and enrichment system comprising a stationary phase consisting of activated carbon fibres and sampling and/or enrichment standards can be used for active or passive sampling of fluid, aeriform, gaseous and liquid matrices.

EXAMPLES

Example 1

The comparison reported in Table 1 between ISO 16000 13 and 14 with EPA TO 4A and 9A, known in the state of the art, shows that the Sampling Standard is added on the quartz fibre filter (QFF). In this study, the ability to keep the Sampling Standard and the PCDD/Fs and PCBs congeners unaltered over time on a quartz fibre filter with respect to an encapsulated ACF filter type ACN-15 was compared.

5 102 mm felt type ACF filters, 2 mm thick, with SSA of about 1500 $m^2/g$ previously washed in Toluene were made. Out of them, three QFFs and three ACF filters were pre-labelled with a known quantity of Sampling Standard, containing $^{13}C_{12}$ PCDD/Fs and PCBs and subsequently encapsulated.

Since the Sampling Standards include only some congeners it was decided to also use a more complete Standard MIX $^{13}C_{12}$ to assess the effect on the remaining compounds. Hypothetically, it could be associated with the process that the compounds undergo once sampled during transport to the laboratory. For this reason out of the remaining pre-washed filters, 2 QFFs and 2 ACF filters were labelled with a known amount of Standard mix. The ACF filters were then encapsulated. It was decided to assess the most influential variable with regard to the volatilisation of the compounds, that is to say temperature.

For the ACF filter type ACN-15, the porosity and its distribution were assessed by BET analysis and Langmuir's equation, identifying the one with predominantly microporous distribution and the presence of slight mesoporosity as the preferred type of ACF.

The type of ACF used is derived from the carbonisation (activation) of phenolic fibres (novoloids) in an inert atmosphere which are conventionally referred to by a term that correlates with the BET number. Specifically, ACF-15 is the activation level that has been selected. The increase in the surface area leads to higher percentages of analyte adsorbed on the material, which can be explained by an increase in the absolute capacity of the material and the larger pore size. The presence of a higher porosity leads to a different energy distribution of the analytes adsorbed on the material. The internal structure of ACF is disordered, and the distance between the various pores greatly influences the force with which the adsorbate interacts with the substrate. The ACFs with a smaller surface area having a narrower porous structure guarantee a more homogeneous substrate on which the analytes can be distributed with a greater binding force (high energy pores) than the situation that would occur with ACF-20 and ACF-25. In the latter, in fact, layers of analytes are created in contact with the substrate with a consequent drastic decrease in the force of interaction among the analytes that are the furthest from the surface and the adsorbent itself.

The adsorbent suitable for sampling must be able to work even in potentially adverse environmental conditions. It is therefore also important to assess the adsorption isotherms of the analytes at different temperatures. ACF-15 exhibits a little variable behaviour going from 25° C. to 150° C. thus guaranteeing reproducible performance even in extreme conditions and at low concentrations.

ACF-15 therefore appears to be the best candidate and at the same time has a good surface area that allows quantitative sampling of the analytes present in the matrices at all concentrations. Moreover, from a macroscopic point of view, as the degree of activation increases, so does the degree of defibration, a negative characteristic of this type of adsorbent.

Filters with Mix of Standard $^{13}C_{12}$ PCDD/Fs and PCBs

The two filters in ACF and QFF were exposed to a constant temperature of 35° C. for 24 h.

Figure 2:
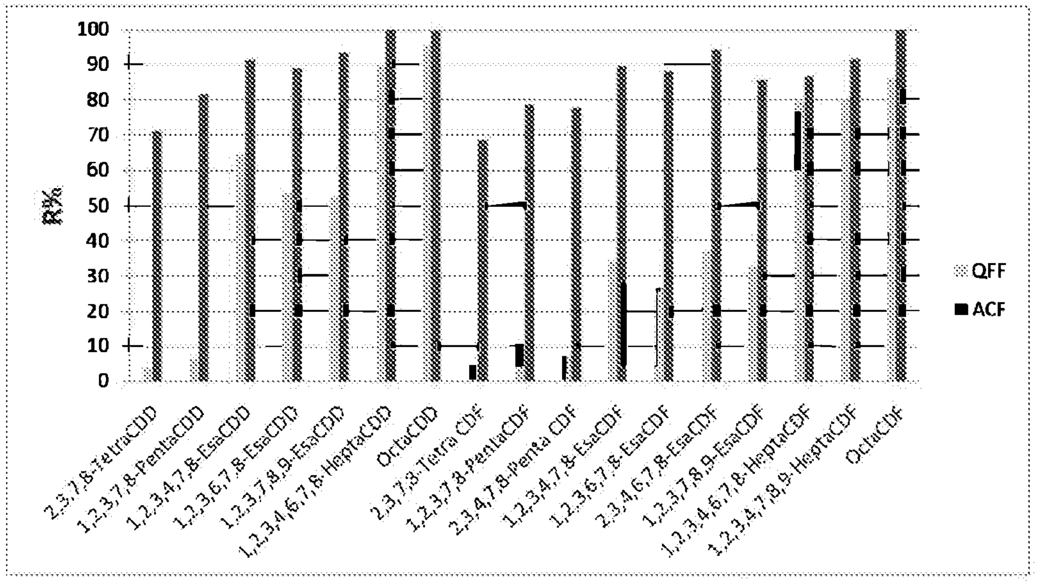
FIG. 2 shows graph the comparison of the average percentage recovery of a MIX of $^{13}C$ PCDD/Fs congeners added on QFF (Quartz Fibre Filters) and ACF (Activated Carbon Fibre) filters after exposure at a temperature of 35° C. for 24 h, Y axis R % (Percentage Recovery), X axis $^{13}C$-labelled PCDD/Fs Congeners.

The data obtained are shown in FIGS. 1 and 2.

Filters with the Sampling Standard

Figure 3:
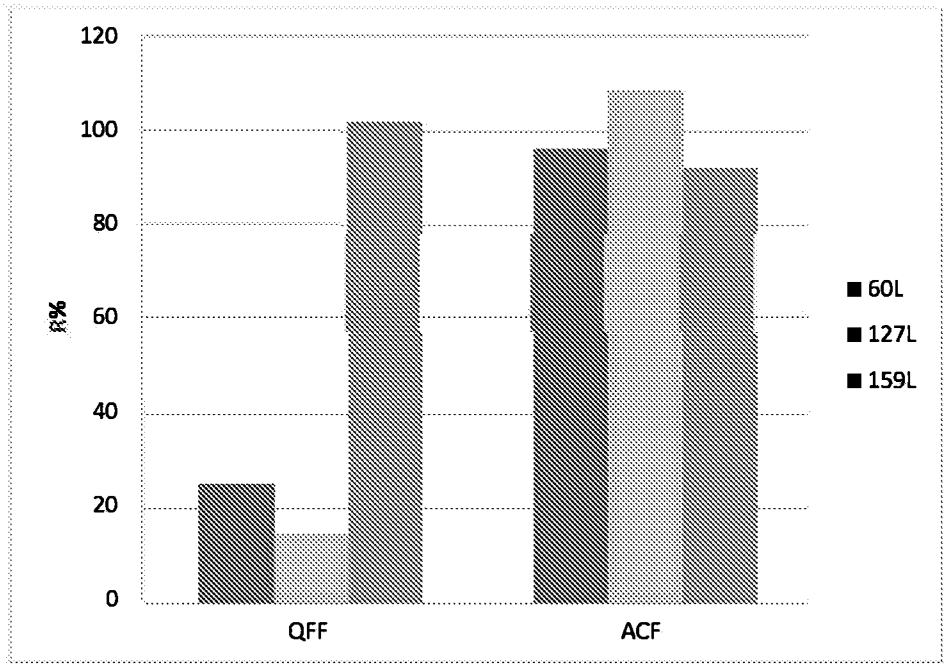
FIG. 3 shows in graph the comparison of the average percentage recovery of the Sampling Standard of $^{13}C$ PCB congeners added on QFF (Quartz Fibre Filters) and on ACF (Activated Carbon Fibre) filters wrapped with aluminium and sealed after exposure to an average temperature of 23.5° C. and relative humidity % of 55.9 for 15 days, Y axis R % (Percentage Recovery), X axis $^{13}C$-labelled PCBs Congeners (L, Labelled).
Figure 4:
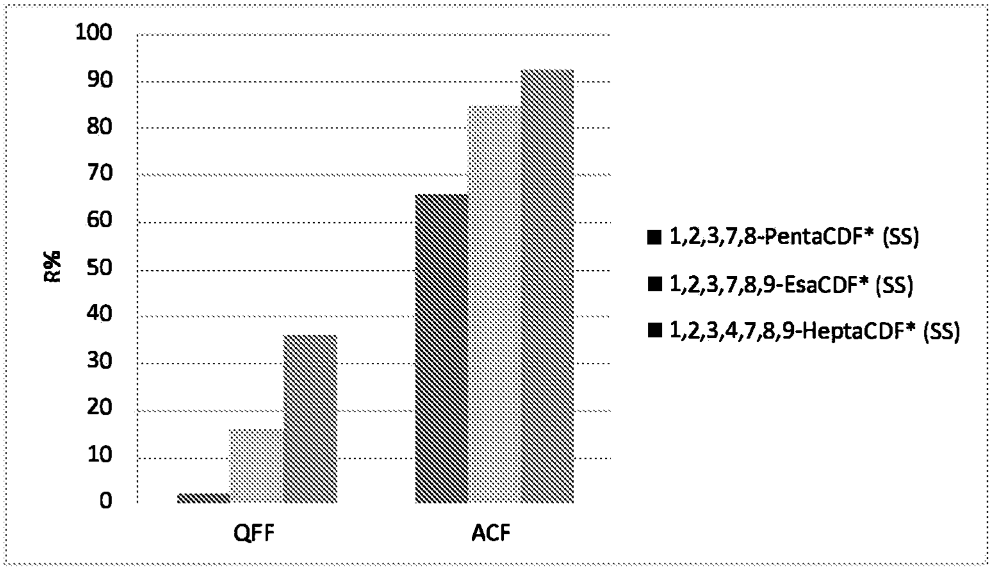
FIG. 4 shows in graph the comparison of the average percentage recovery of the Sampling Standard of $^{13}C$ PCDD/Fs congeners added on QFF (Quartz Fibre Filters) and on ACF (Activated Carbon Fibre) filters wrapped with aluminium and sealed after exposure to an average temperature of 23.5° C. and relative humidity % of 55.9 for 15 days, Y axis R % (Percentage Recovery), X axis $^{13}C$-labelled PCDD/Fs Congeners.

The 6 filters (3 in QFF and 3 in ACF) were labelled with 1000 pg of the Sampling Standard $^{13}C_{12}$ of PCDD/Fs and PCBs. They were then packaged in the same way: wrapped with aluminium previously cleaned with DCM and sealed in airtight packaging. The filters were placed at an average temperature of 23.5° C. (MAX 37.4° C.; MIN 9.8° C.) and an average relative humidity of 55.9% (MAX 89.3%; MIN 30.7%) for 15 days. Assuming the transport of pre-labelled filters during the summer months, the temperature considered was in any case underestimated. Following exposure, the 6 filters were extracted separately to assess the R % of the standards. FIGS. 3 and 4 show the average % recoveries for PCDD/Fs and PCBs.

The data reported in FIGS. 1-4 show that the adsorbent medium commonly used (QFF) for air sampling of PCDD/Fs and PCBs does not have the same ability to maintain the Sampling standard, let alone the Standard MIX unaltered over time. Temperature, a parameter judged to be among the most influential in this process, appears to alter the original concentration of Standard affixed on the adsorbent medium.

The ACF filter subjected to thermal stress maintains satisfactory average R % such that, regardless of temperature, they can be used as if the Sampling Standard had been recently added (FIGS. 3 and 4). Similarly, it was demonstrated that the filters simulating a sampling do not undergo any alteration due to temperature (FIGS. 1 and 2). The same does not apply for quartz fibre filters, which have been treated in exactly the same way as ACF filters and show satisfactory recoveries only for the higher molecular weight classes.

This demonstrates how quartz fibre filters are susceptible to errors and underestimation if they are pre-labelled and can be subject to large losses of sampled analytes.

Example 2

In the case of use for the ISO 16000 13A method, a felt type ACF fibre filter ACN 15 is cut with a diameter of 102 mm, thickness of 2 mm, with SSA of about 1500 $m^2/g$. This method is aimed at the sampling PCDD/Fs and PCBs for this reason tetradecane is added to the nonane solution in which the sampling standards are contained.

Optimal conditions were identified in order to position the PCDD/Fs and PCBs sampling standards on the ACN 15 type ACF membranes and subsequently encapsulated. After that, the capture systems were stored in aluminium sheets prewashed with Dichloro Methane (DCM) and sealed in airtight bags.

The packaged membranes were allowed to rest by assessing two out of the factors that affect the system's ability to maintain the standard unaltered: temperature and time.

It was decided to assess an exposure of 7 days, 1 month and 6 months; each test was carried out at two temperatures, both ambient temperature of 22° C. and refrigerator temperature of 4° C. All tests were performed in triplicate to ensure reproducibility of the result.

Figure 5:
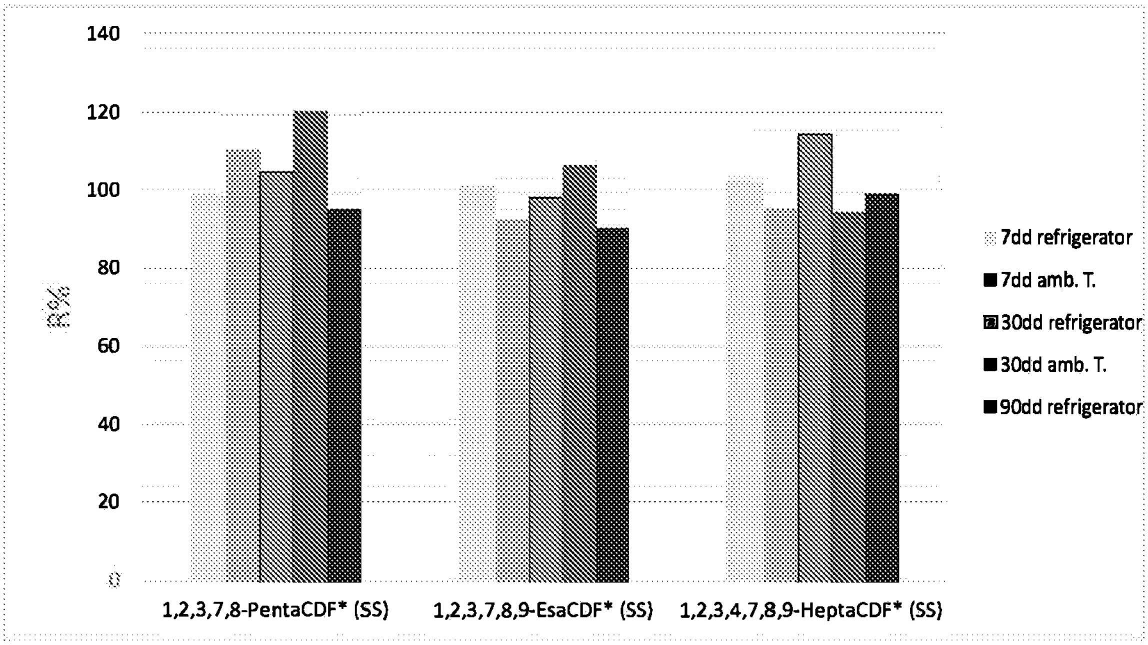
FIG. 5 shows in graph the comparison of the average percent recovery of the Sampling Standard of $^{13}C$ PCDD/Fs congeners added on ACF (Activated Carbon Fibres) type ACN 15 encapsulated, wrapped with aluminium and sealed, after 7 days, 30 days (1 month) and 90 days (3 months) at ambient temperature of about 20° C. and refrigerator temperature of about 4° C., Y axis R % (Percentage Recovery), X axis $^{13}C$-labelled PCDD/Fs Congeners used as Sampling Standard.
Figure 6:
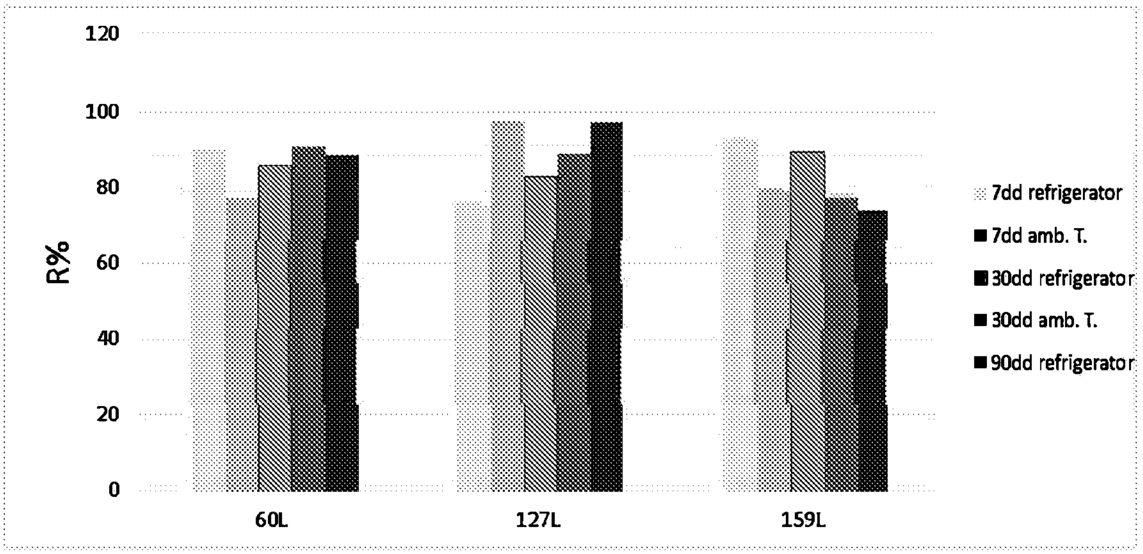
FIG. 6 shows in graph the comparison of the average percent recovery of the Sampling Standard of $^{13}C$ PCBs congeners added on ACF (Activated Carbon Fibres) type ACN 15 encapsulated, wrapped with aluminium and sealed, after 7 days, 30 days (1 month) and 90 days (3 months) at ambient temperature of about 20° C. and refrigerator temperature of about 4° C., Y axis R % (Percentage Recovery), X axis $^{13}C$-labelled PCBs congeners (L, Labelled) used as Sampling Standard.
Figure 7:
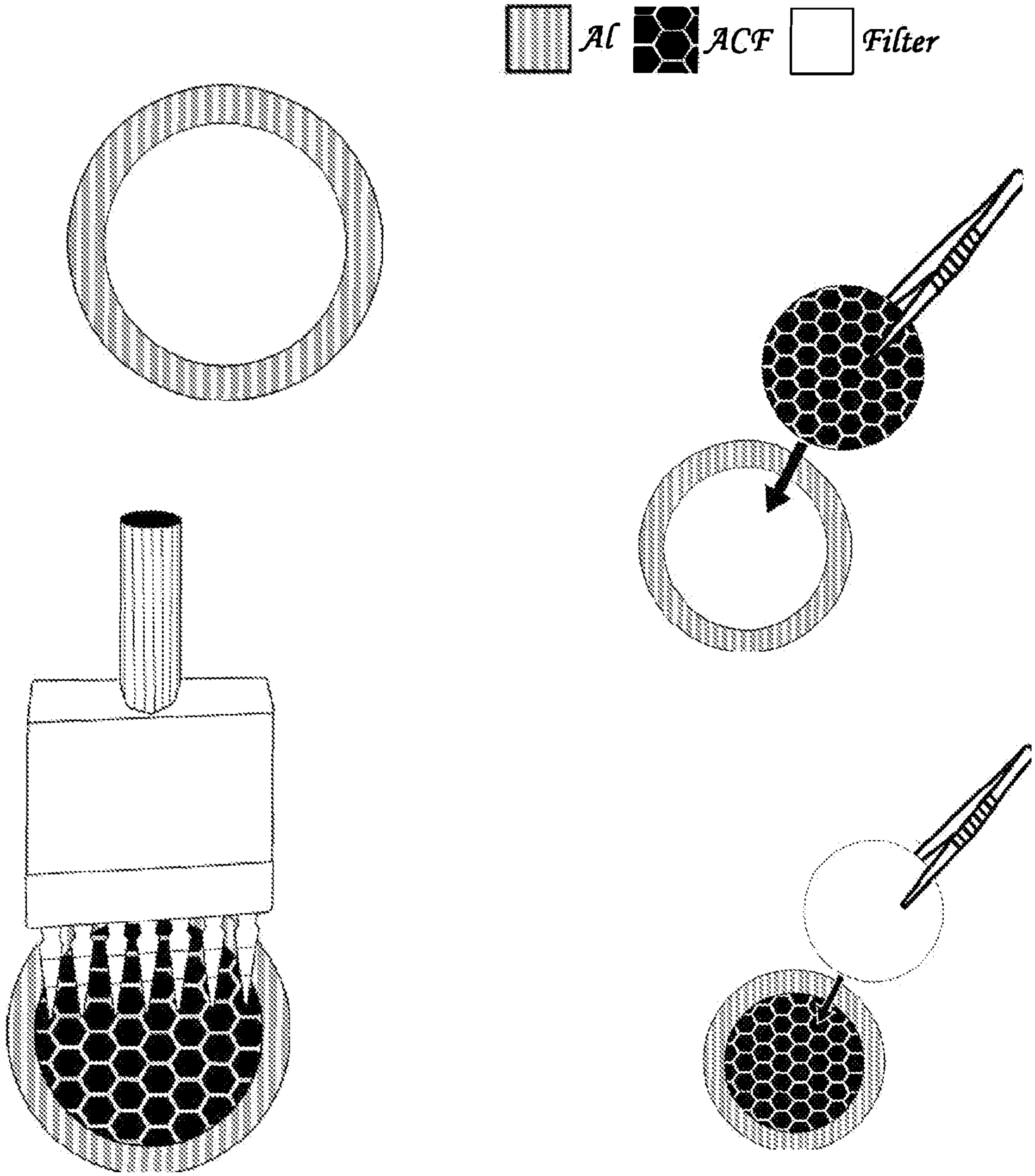
FIG. 7 schematically shows the preparation of ACF filters type ACN 15 encapsulated with aluminium edge.

The results are shown in FIGS. 5 and 6.

The data reported so far show that ACF has the ability to maintain the concentrations of the standards added to it unaltered over time for up to 6 months. This makes it possible to assume that several filters can be prepared and can be used over a long distance.

Example 3

According to the studies carried out on the activated carbon fibres as an enrichment or sampling medium in water (Cerasa et al. 2020, Validation studies on activated carbon fibre passive sampler for PCDD/Fs and PCBs in water, Chemosphere, January; 239:124666. doi: 10.1016/j.chemosphere.2019.124666. Epub 2019 Aug. 25) it can be stated that this filter can also be used for aqueous matrices. In fact, in "Validation studies on activated carbon fibre passive sampler for PCDD/Fs and PCBs in water" the material is assessed as suitable according to the requirements of the ISO 1613B and 1668B methods (for PCDD/Fs and PCBs, respectively).

The object of the present invention does not exclude its use in aqueous matrices, which in the present example relates to the micropollutants PCDD/Fs and PCBs, but which in general does not exclude the possibility of extension to other micropollutants. Assuming a passive system such as the one of POCIS (Polar Organic Chemical Integrative Sampler) could be, the ACF filter (encapsulated) is perfectly suited for passive sampling in watercourses. In addition, a use as an active enrichment system can be assessed if inserted into SPE cartridges inside which the water sample is flushed through pumps as in the case "Innovative fast SPE for the extraction of PCDD/Fs and dl-PCBs in aqueous samples D preliminary assessment".

The sampling standards pre-spiked on the ACF therefore allow to streamline the processes on site by proceeding with the simple operation of inserting the filter in housings prepared for the adsorbent medium. The presence of Standards allows correcting errors due to losses and any breakthrough related to the sampled water volumes. The results show that the pre-packaged ACF filter in one of the possible methods with the addition of the Sampling Standards, which in the example shown are PCDD/Fs and PCBs, is able to retain these compounds unaltered over time for up to 6 months. The estimated percentage recoveries from the replicates allow filters with the pre-spiked Standard to be considered as usable.

Example 4

In order to assess the importance of the stripping phenomenon, the quantitative results of 3 encapsulated ACF filters were compared with 3 ACF filters used as such.

The encapsulation involved placing the ACF between 2 quartz filters ringed with 2 aluminium rings all of them with a diameter of 102 mm and SSA greater than 1500 v.1 m2/g.

The Sampling Standard of PCDD/Fs and PCBs in nonane stabilised in tetradecane is added on all membranes in ACF (those encapsulated before closure).

The membranes thus packaged were treated by simulating a sampling of ambient air. In this regard, all the membranes were stored for a short time (less than 1 hour) in aluminium sheets, transported to a monitoring station for ambient air, mounted on a Large Volume sampler (Echo Hi-Vol Tecora), starting the sampler for only 5 minutes at a flow of 200 l/min. The membranes were then placed in aluminium sheets and transported to the laboratory. This experiment was used to assess the possible losses due to the stripping of the ACF fibres. During the experiment, as to the unsealed membranes, residual fibres both on the aluminium sheets used for transport and storage and the fibres on the filter holder grid of the high volume sampler were visually observed. All membranes were extracted in Soxhlet through the use of a quartz filter thimble. Upon insertion of the unsealed ACF membranes into the thimble, additional fibre losses were noted in the air and outside the thimble. The samples were spiked with $^{13}C_{12}$-labelled extraction standards of PCDD/Fs and PCBs. After the 36-hour hot extraction in toluene, the extract was concentrated and the samples relative to the unsealed membranes with quartz filters and aluminium ferrule, showed some residual fibres in the test tube. It was therefore necessary to filter the samples and in order not to alter the experimentation, the solutions from the sealed ACF samples were also filtered, although they did not require filtration. Filtration was performed with 47 mm quartz filters, with subsequent elution of the residue with further 5 ml of toluene.

The reported data show that the sampling standards found on the unsealed adsorbent are on average about 10% lower for both PCBs and PCDD/Fs.

TABLE 3

| | R % ACF | |
|---|---|---|
| Sealed ACF vs ACF | Sealed ACF | ACF free fibres |
| 1,2,3,7,8-PentaCDF* (SS) | 97.2 | 89.4 |
| 1,2,3,7,8,9-HexaCDF* (SS) | 98.7 | 91.1 |

TABLE 3-continued

| Sealed ACF vs ACF | R % ACF Sealed ACF | ACF free fibres |
|---|---|---|
| 1,2,3,4,7,8,9-HeptaCDF* (SS) | 105.1 | 93.5 |
| Average recoveries % | 100.3 | 91.3 |

TABLE 4

| Sealed ACF vs ACF | | R % ACF Sealed ACF | ACF free fibres |
|---|---|---|---|
| 2,3,4,4'-TetraCB* (SS) | 60 L | 93.2 | 84.2 |
| 3,3',4,5,5'-PentaCB* (SS) | 127 L | 94.5 | 84.1 |
| 2,3,3',4,5,5'-HexaCB* (SS) | 159 L | 100.1 | 91.0 |
| Average recoveries % | | 95.9 | 86.4 |

A more pronounced difference is observed on the R % of the extraction standards. This difference (about 20% for PCDD/Fs and even about 30% for PCBs) can be attributed precisely to the adsorption action of the fibres that were transported by the toluene during the extraction step in Soxhlet. These free fibres present on the extract adsorbed the standards and the filtration following elution/washing with 5 ml of toluene were not sufficient to recover the analytes of interest.

TABLE 5

| PCBs | | Sealed ACF R % | Unsealed ACF R % |
|---|---|---|---|
| 3.4.4'.5-TetraCB* | 81 L | 90.7 | 61.4 |
| 3.3'.4.4'-TetraCB* | 77 L | 94.8 | 61.9 |
| | 123 L | 95.6 | 63.9 |
| | 118 L | 97.6 | 63.0 |
| | 114 L | 98.3 | 70.2 |
| | 105 L | 100.1 | 71.0 |
| | 126 L | 95.1 | 67.0 |
| | 167 L | 98.8 | 69.8 |
| | 156 L | 95.4 | 73.7 |
| | 157 L | 101.5 | 19.7 |
| | 169 L | 95.6 | 82.6 |
| | 189 L | 107.6 | 84.2 |
| Average recoveries % | | 97.6 | 65.7 |

TABLE 6

| PCDD/Fs | Sealed ACF R % | Unsealed ACF R % |
|---|---|---|
| 2,3,7,8-TetraCDD | 85.9 | 69.9 |
| 1,2,3,7,8-PentaCDD | 86.2 | 71.6 |
| 1,2,3,4,7,8-HexaCDD | 96.7 | 73.7 |
| 1,2,3,6,7,8-HexaCDD | 98.3 | 77.9 |
| 1,2,3,7,8,9-HexaCDD | 97.5 | 75.4 |
| 1,2,3,4,6,7,8-HeptaCDD | 101.5 | 72.3 |
| OctaCDD | 104.3 | 71.8 |
| 2,3,7,8-Tetra CDF | 84.8 | 68.7 |
| 1,2,3,7,8-PentaCDF | 78.8 | 67.8 |
| 2,3,4,7,8-Penta CDF | 77.7 | 70.3 |
| 1,2,3,4,7,8-HexaCDF | 89.7 | 74.0 |
| 1,2,3,6,7,8-HexaCDF | 88.3 | 75.2 |
| 2,3,4,6,7,8-HexaCDF | 94.5 | 72.8 |
| 1,2,3,7,8,9-HexaCDF | 85.9 | 73.4 |
| 1,2,3,4,6,7,8-HeptaCDF | 86.6 | 76.9 |
| 1,2,3,4,7,8,9-HeptaCDF | 91.7 | 71.0 |

TABLE 6-continued

| PCDD/Fs | Sealed ACF R % | Unsealed ACF R % |
|---|---|---|
| OctaCDF | 102.7 | 71.8 |
| Average recoveries % | 91.2 | 72.6 |

Example 5

While the experimental tests were carried out on a handmade laboratory prototype, an embodiment was prepared using an industrialised system and the product gave the same results as in example 4.

In particular, the process consists in the preparation of the material of the casing which in its original form is typically in sheets. Each sheet is cut to the required dimensions, slightly exceeding those of the stationary phase, and placed on two matrices prepared for thermoforming (male matrix for forming the lid and female matrix for forming the bottom), which is then carried out by punching. The stationary phase is placed in the thermoformed bottom and is then spiked with the sampling/enrichment standards by means of a micro-droplet diffusion system with high quantitative precision (quantitative precision: 10 µl±0.20 µl)

After placing the covering casing to the inside of the lid, a pre-welding step takes place, under controlled atmosphere conditions by means of nitrogen insufflation in order to eliminate any excess solvent, until a continuous ring welding is obtained around the membrane. This is followed by final welding in the circular edge around the central membrane in order to obtain a good structural stiffness for the final product to allow easy handling.

Example 6

At the same time, the chemical-physical characterisation of the ACF identified as the one with the most suitable activation degree ACN-15 was carried out. In particular, the analysis of the Specific Surface Area according to the Brunauer Emmett and Teller (BET) method and the application of the Langmuir equation based on nitrogen absorption is reported below. Prior to the measurements, the sample was degassed at 150° C. with nitrogen flow.

Nitrogen adsorption increases rapidly and the resulting Langmuir isotherm is equivalent to the one of type I: perfectly microporous material. There is a slight hysteresis point in the isotherm which demonstrates the presence of mesoporosity.

This dual aspect is confirmed by the results of the porous distribution (PSD), which identifies 1.2 nm (microporosity) and 22 nm (mesoporosity) as the average diameter.

The characterisation of the active groups that are mainly attributable to the porosity cavities through Boehm titration was also carried out (K. K. Beltrame, A. L. Cazetta, P. S. C. de Souza, L. Spessato, T. L. Silva, V. C. Almeida, Adsorption of caffeine on mesoporous activated carbon fibers prepared from pineapple plant leaves, Ecotoxicol. Environ. Saf. 147 (2018) 64-71. https://doi.org/10.1016/j.ecoenv.2017.08.034).

Based on the literature data previously reported in Example 3, it is believed that the ACF in the table type ACN-15 with which the tests were carried out, may have better performance. Not only for the ease of adsorption even at low ACN concentrations with SSA at 1500 compared to that at 2000 $m^2/g$, but also for the lower presence of acidic groups that tend to coordinate water molecules and remove active sites for the adsorption of the pollutants.

In which we see a clear prevalence of basic groups compared to total acidic groups consisting for the most part of phenolic groups.

TABLE 7

| | ACN 15 Kynol |
|---|---|
| SSA | >1500 $m^2/g$ |
| Pore diameter | 1.2 nm; 22 nm |
| | Microporous solid with presence of slight mesoporosity |
| Chemical Characterization (in $10^{-6}$ meq/$m^2$) by Boehm Titration. | |
| Carboxylic groups | 3 |
| Lactonic groups | 16 |
| Phenolic groups | 53 |
| Pyronic groups | 130 |
| Acidic groups | 72 |

The invention claimed is:

1. A cartridge comprising a liquid-porous and an air-porous casing having contained therein a stationary phase comprising an adsorbent filter, wherein the liquid-porous and air-porous casing is sufficiently porous to allow the passage of at least one of liquid and air through the liquid-porous and air-porous casing to the stationary phase, wherein the stationary phase comprising the adsorbent comprises a fabric comprised of activated carbon fibers (ACF) having a micro-meso porous conformation and a specific surface area of about 1500 $m^2/g$ as measured by a Brunauer Emmett and Teller (BET) method, wherein the stationary phase comprising the adsorbent filter is encapsulated or confined within the liquid-porous and air-porous casing, wherein at least one analyte standard compound is coated on or affixed to the stationary phase comprising the adsorbent filter, and wherein the at least one analyte standard compound is spotted on, coated on or applied to the stationary phase comprising the adsorbent filter in a known amount or concentration, and the at least one analyte standard compound is isotopically labelled, wherein the liquid-porous and air-porous casing is not sufficiently porous to allow loss of micro- or macro-sized parts of the ACF in the stationary phase comprising the adsorbent filter to move or flow out of the liquid-porous and air-porous casing, thereby ensuring there is no loss of any of the at least one analyte standard compound from the cartridge.

2. The cartridge of claim 1, wherein the liquid-porous and air-porous casing is comprised of aluminium and the stationary phase comprising the adsorbent filter is wrapped or contained within the aluminium.

3. The cartridge of claim 1, wherein the liquid-porous and air-porous casing is comprised of a material selected from the group consisting of: natural polymers, synthetic polymers, cellulose or silica-based sheets, wire meshes and a combination thereof.

4. The cartridge of claim 1, wherein the liquid-porous and air-porous casing is comprised of a material selected from the group consisting of: a quartz fibre, polypropylene, a nylon fiber, an aldehydic fiber, a phenolic fiber, an amine fiber, a vinyl fiber, a cellulose fiber, a cellulose derivative, a metal screen and combination thereof.

5. The cartridge of claim 1, wherein a plurality of analyte standard compounds are coated on or affixed to the stationary phase and are isotopically labelled.

6. The cartridge of claim 1, wherein the stationary phase comprises activated carbon fibers having a microporosity and a mesoporosity as determined by a pore size distribution analysis.

7. The cartridge of claim 1, wherein the at least one analyte standard compound comprises an organic micropollutant or an airborne micropollutant.

8. The cartridge of claim 7, wherein the organic micropollutant comprises a polychlorinated dibenzo-p-dioxin (PCDD), a polychlorinated dibenzo-p-furan (PCDF) or a polychlorinated biphenyl (PCB).

9. The cartridge of claim 1, wherein at least one analyte standard compound comprises: a polycyclic aromatic hydrocarbon, a polychlorinated biphenyl, a polychlorinated dibenzo-para-dioxin, a polychlorinated dibenzofuran, a chlorobenzene, an alkylbenzene, an alkane, a phthalic acid ester, a polybrominated diphenyl ether, a perfluoroalkylated drug, a perfluoroalkylated substance (PFAS-PFOA), a metabolite, mercury in elemental form, mercury in bound form or a semi-volatile metal halide.

10. The cartridge of claim 1, wherein the at least one analyte standard compound is spotted on, coated on or applied in predefined positions on the stationary phase comprising the adsorbent filter.

11. The cartridge of claim 10, wherein the at least one analyte standard compound is spotted on, coated on or applied in predefined positions on the stationary phase comprising the adsorbent filter using an automatic multi-tip dispenser.

12. The cartridge of claim 11, wherein the stationary phase comprising the adsorbent filter in the automatic multi-tip dispenser is positioned on a rotating disk or an oscillatory plate with adjustable and constant speed, and the at least one analyte standard compound is distributed simultaneously on the stationary phase comprising the adsorbent filter with the movement of the membrane, thus ensuring equal distribution over the entire surface.

13. The cartridge of claim 1, wherein the liquid-porous and air-porous casing is sealed to the cartridge by a method selected from the group consisting of: sewing, thermal welding, chemical welding, electrical welding, pneumatic welding, ultrasonic welding, bonding, melting, bending, punching, riveting, an external closure, and a cohesive solvent, with the proviso that the liquid-porous and air-porous casing is never closed with a process that comprises use of any type of adhesive or glue.

14. The cartridge of claim 1, wherein the activated carbon fibers (ACF) are coated with a composition comprising: squalene, methylsilicone, methyl-phenyl-silicone 20% phenyl, methyl-phenyl-silicone 50%, cyanopropyl-methyl-phenyl-silicone, Polyethylene glycol, nitroterephthalic ester of PEG (FFAP) or diethylene glycol succinate (DEGS) or any combination thereof.

15. The cartridge of claim 1, wherein the fabric comprises a felt comprising a woven felt or a non-woven felt, or a felt comprising an activated carbon felt grade designation 15 felt.

16. The cartridge of claim 1, wherein the stationary phase comprising the adsorbent filter is pre-washed with solvent before its insertion into the cartridge.

17. The cartridge of claim 16, wherein the pre-wash solvent comprise toluene.

18. The cartridge of claim 1, wherein the stationary phase comprising the adsorbent filter has a diameter of about between about 47 and 102 millimetres (mm), a thickness of about 2 mm, and a surface area of about 1500 $m^2/g$.

19. The cartridge of claim 1, wherein the carbon fibers have a diameter of between about 5 to 10 microns.

20. A product of manufacture configured as a volume sampler having mounted thereon a cartridge of claim 18.

21. A cartridge comprising a liquid-porous and an air-porous casing having contained therein a stationary phase comprising an adsorbent filter, wherein the stationary phase comprising the adsorbent filter comprises a fabric comprised of activated carbon fibers (ACF) having a micro-meso porous conformation and a specific surface area of about 1500 m2/g as measured by a Brunauer Emmett and Teller (BET) method, wherein the stationary phase comprising the adsorbent filter is encapsulated or confined within the liquid-porous and air-porous casing, wherein at least one analyte standard compound is coated on or affixed to the stationary phase comprising the adsorbent filter, wherein the at least one analyte standard compound is spotted on, coated on or applied to the stationary phase comprising the adsorbent filter in a known amount or concentration, wherein the liquid-porous and air-porous casing is sufficiently porous to allow the passage of at least one of liquid and air to pass through the liquid-porous and air-porous casing to the stationary phase comprising the adsorbent filter, but not sufficiently porous to allow loss of micro- or macro-sized parts of the ACF in the stationary phase comprising the adsorbent filter to move or flow out of the liquid-porous and air-porous casing, thereby ensuring there is no loss of any of the at least one analyte standard compound from the cartridge, wherein the at least one analyte standard compound is the same as an analyte to be sampled and measured, and the at least one analyte standard compound is labeled and the analyte to be sampled and measured is unlabeled.

22. A cartridge comprising a liquid-porous and an air-porous casing having contained therein a stationary phase comprising an adsorbent filter, wherein the stationary phase comprising the adsorbent filter comprises a fabric comprised of activated carbon fibers (ACF) having a micro-meso porous conformation and a specific surface area of about 1500 m2/g as measured by a Brunauer Emmett and Teller (BET) method, wherein the stationary phase comprising the adsorbent filter is encapsulated or confined within the liquid-porous and air-porous casing, wherein at least one analyte standard compound is coated on or affixed to the stationary phase comprising the adsorbent filter, wherein the at least one analyte standard compound is spotted on, coated on or applied to the stationary phase comprising the adsorbent filter in a known amount or concentration, wherein the liquid-porous and air-porous casing is sufficiently porous to allow the passage of at least one of liquid and air to pass through the liquid-porous and air-porous casing to the stationary phase comprising the adsorbent filter, but not sufficiently porous to allow loss of micro- or macro-sized parts of the ACF in the stationary phase comprising the adsorbent filter to move or flow out of the liquid-porous and air-porous casing, thereby ensuring there is no loss of any of the at least one analyte standard compound from the cartridge, wherein the activated carbon fibers are coated with a composition comprising: squalene, methylsilicone, methyl-phenyl-silicone, methyl-phenylsilicone, cyanopropyl-methyl-phenyl-silicone, Polyethylene glycol, nitroterephthalic ester of PEG (FFAP) or diethylene glycol succinate (DEGS).

* * * * *